United States Patent [19]

Gillilan

[11] Patent Number: 4,691,513
[45] Date of Patent: Sep. 8, 1987

[54] ROTARY POWER TRANSDUCER SYSTEM

[76] Inventor: James Gillilan, 1807 W. College, Sherman, Tex. 75090

[21] Appl. No.: 895,157

[22] Filed: Aug. 11, 1986

[51] Int. Cl.$^4$ ............................................. F03B 13/14
[52] U.S. Cl. ...................................... 60/495; 417/337
[58] Field of Search ................ 60/495, 496, 497, 506, 60/639, 721, 325, 327; 417/337

[56] References Cited

U.S. PATENT DOCUMENTS

| | | | |
|---|---|---|---|
| 467,072 | 1/1892 | White | 417/337 |
| 4,497,173 | 2/1985 | Gillian | 60/495 |

*Primary Examiner*—Stephen F. Husar
*Attorney, Agent, or Firm*—Stanley R. Moore

[57] ABSTRACT

Method of and apparatus for generating energy from a rolling or swiveling float tank utilizing the buoyant force of water contained therein. The float tank is mounted upon a central pivot to continuously swivel therearound. A series of flotation devices are mounted within the tank and forced upwardly by the buoyancy of the fluid volume shifting therein. The series of flotation devices are coupled to hydraulic cylinders or the like for transducing the energy resulting from the rolling flotation tank into a usable form. Swiveling of the tank is effected through a flow ballast fluid around the tank, the ballast transfer being affected by a central ballast discharge tank. The ballast fluid can be pumped from the tank or supplied externally to provide an efficient transducer system.

17 Claims, 2 Drawing Figures

ROTARY POWER TRANSDUCER SYSTEM

BACKGROUND OF THE INVENTION

1. Field of Invention

The present invention relates to energy transducer systems and, more particularly, to method of and apparatus for converting energy through a swiveling, fluid filled vessel utilizing the buoyant force of fluid contained therein.

2. History of the Prior Art

The prior art is replete with a myriad of apparatus utilizing waters and working on power fluid. For example, prior art U.S. Pat. No. 4,497,173 issued to applicant herein specifically sets forth a pivotal system utilizing water as a working or power fluid with a rocking flow tank. This recent advance in power fluid transducer systems is a marked advance over the prior art, and the present invention sets forth large scale improvements therein.

The genesis of water power systems extends into technological antiquity. This is due in part to the abundance of water on our planet and the ever growing need for more energy. Such systems include the system shown in the aforementioned U.S. Pat. No. 4,497,173, as well as more antiquated forms of water wheels and water turbines. Aside from the aforementioned patent, more conventional applications of water power are manifested in other patents issued by the U.S. Patent and Trademark Office for water motors and the like. Other ones of these patents address simply the weight characteristics of water and its liquid state such as the rather old (1896) U.S. Pat. No. 556,391 issued to Wood. This approximately 90 year old reference, utilizes the weight of water and its fluid nature for achieving an hydraulic motor. Water from a reservoir is sequentially vented into opposing collection troughs disposed on opposite ends of a pivotal beam. Sequential filling and emptying of the water from the reservoir into the trough causes pivotal action and the generation or the transducing of energy from the rocking action thereof. In this manner, a secondary fluid such as air or hydraulic fluid x-ray be pumped by the motor for further utilization from the rocking action. As stated before, the present invention recognizes the rocking action of prior art embodiments and is a marked advance thereover.

The oscillation of beams and water collection means disposed at opposite ends thereof is also set forth as shown in prior U.S. Pat. Nos. 927,789 issued to Broadwell in 1869, 223,930 issued to Lay in 1880, 429,392 to Smyth in 1890, 479,291 to Marsh in 1892, and 1,036,587 to Doyle et al. in 1912. These prior art references each reflect certain new and useful improvements in water motors. For example, the Smyth patent utilizes not only the weight of the water but the buoyant characteristic thereof by utilizing a series of flotation elements for controlling the accumulation of the water within the vessel and the release thereof for flotation. In each of these cases it is the liquid weight of the fluid which effects the transfer of energy.

More conventional prior art applications of hydraulics to energy conversion systems are set forth as shown in U.S. Pat. Nos. 3,803,847 to McAllister, 3,521,445 to Grable, 3,100,965 to Blackburn, and 4,086,765 to the inventor of the subject application. These references clearly show the advancement in technology affording new and multiple uses of liquid hydraulics and advances in systems incorporating same. For example, several of the aforesaid patents incorporate compressed air derived from a storage tank or the like to pressurize pumping or hydraulic chambers. These energy conversion systems have multiple uses including heating, cooling, and generating electrical or mechanical power. Similarly, many of these systems address the aspect of limiting the amount of fluid wasted in the cycling process to create a more energy conservative system. By utilizing compressed air, it is said that the pressure head of a more dense fluid such as water may be converted to an air pressure in not only a single but a plurality of vessels having a much greater volume than the original pressure generating volume. The potential energy in the form of air pressure may then be utilized to reduce the pressure across a compressed gas pumping system to reduce the power required for fluid recirculation.

While numerous aspects of fluid hydraulics in energy conversion have been tapped in the aforesaid prior art approaches, conventional technology has not fully addressed the buoyant characteristics of water in rotary systems. For example, water contained within a vessel afforded the option of rotating about a center point may be utilized in the conversion of energy. The tank itself does not have to rotate to induce the water therein to do so.

It would be an advantage therefor to utilize the inherent fluid characteristics of a mass such as water in a liquid state in association with a controlled rotation of the water volume in a tank which simply swivels about a center point. The methods and apparatus of the present invention provide such a system by utilizing mechanical, electrical, hydraulic or pneumatic systems to pump ballast through a ballast network coupled to a flotation vessel which swivels about its center and contains such fluid therein. A series of flotation elements disposed for seriatim actuation within the vessel are then sequentially buoyed by the contained fluid and the swivel rotation of the vessel creates a continuous rise and fall in the fluid level relative to the respective flotation elements for the creation of differential flotation forces. By tapping this continuous buoyancy differential manifested through the swivel action of the vessel, an energy transducer system is provided.

SUMMARY OF THE INVENTION

The present invention relates to an energy conversion system for generating power through a shifting fluid mass contained within a swivel vessel by the utilization of a circular array of flotation elements disposed therein. More particularly, one aspect of the present invention comprises an energy transducer system including a flotation tank adapted to swivel in a tilting mode (much like a swash plate) about its center with floats therein, and means for producing a myriad of unbalanced system positions. Means are provided for swiveling the tank for transducing energy from the floats and the shifting fluid level within the tank.

Another aspect of the present invention comprises the aforesaid system wherein an energy transducer system comprises a flotation tank having fluid disposed therein and means for centrally supporting the flotation tank for swiveling therearound in a series of unbalanced positions. Means are provided for swiveling the tank around the central support and shifting the fluid disposed therein. Flotation means disposed within the tank are adapted for floating upon the fluid contained within the tank. Means are coupled to the flotation means for actuation therewith in transducing energy from shifting fluid levels within the tank throughout the swivel action thereof.

In yet another aspect, the invention includes the aforesaid energy transducing system and a plurality of piston and cylinder assemblies, each coupled to the plurality of flotation elements adapted for receiving the energy produced by the flotation elements within the flotation tank during the shifting fluid levels therein. The cylinder means comprises hydraulic cylinders adapted for the pumping of hydraulic fluid during the rise in fluid level commensurate with shifts in the fluid level during the swivel action of the tank. The swiveling means, in one embodiment, comprises a ballast network adapted for containing selected fluid levels therein and being secured to the outer perimeter of the tank for imparting the swivel motion thereto. The ballast means includes an outer trough, which may be circular, having a plurality of baffles contained therein for defining segmented ballast regions disposed outwardly of the flotation tank and means coupling the plurality of baffled ballast regions for sequentially receiving fluid therein for the swivel of the tank. The system further includes means for selectively pumping fluid into the ballast sections around the tank for swiveling the tank around the pivot.

In a further aspect, the invention includes the aforesaid apparatus wherein the ballast pumping means includes compressed air in flow communication with the fluid contained within the tank and a central distribution vessel having a plurality of orifices formed therein and coupled in flow communication with select sections of the ballast network. The orifices of the central ballast distribution vessel are coupled to ballast chambers which are disposed on the order of 90° "ahead of" the orifice for discharging ballast into the ballast region and imparting rotation in the direction thereof.

In yet a further aspect, the invention includes a method of transducing energy by rotating fluid levels within a containment vessel comprising the steps of mounting the containment vessel for a series of off balance position and providing a means for imparting the series of off balance positions to the containment vessel. A plurality of flotation means are disposed within the containment vessel and in positions responsive to shifts in fluid levels within said vessel. Means are provided for absorbing power from the flotation elements within the containment vessel in response to shifts of fluid level therein. The flotation elements are coupled to the power absorbing means and the containment vessel swivels around the central pivot for the shifting of the fluid levels therein. This results in the sequential raising and lowering of the plurality of flotation elements within the fluid in response to the variations of the fluid level during the swiveling. The off-balance means may include a fluid ballast or mechanical system. The step of swiveling the containment vessel preferably includes the step of shifting fluid within a ballast means for moving the center of gravity of the containment vessel ahead of the fluid therein.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
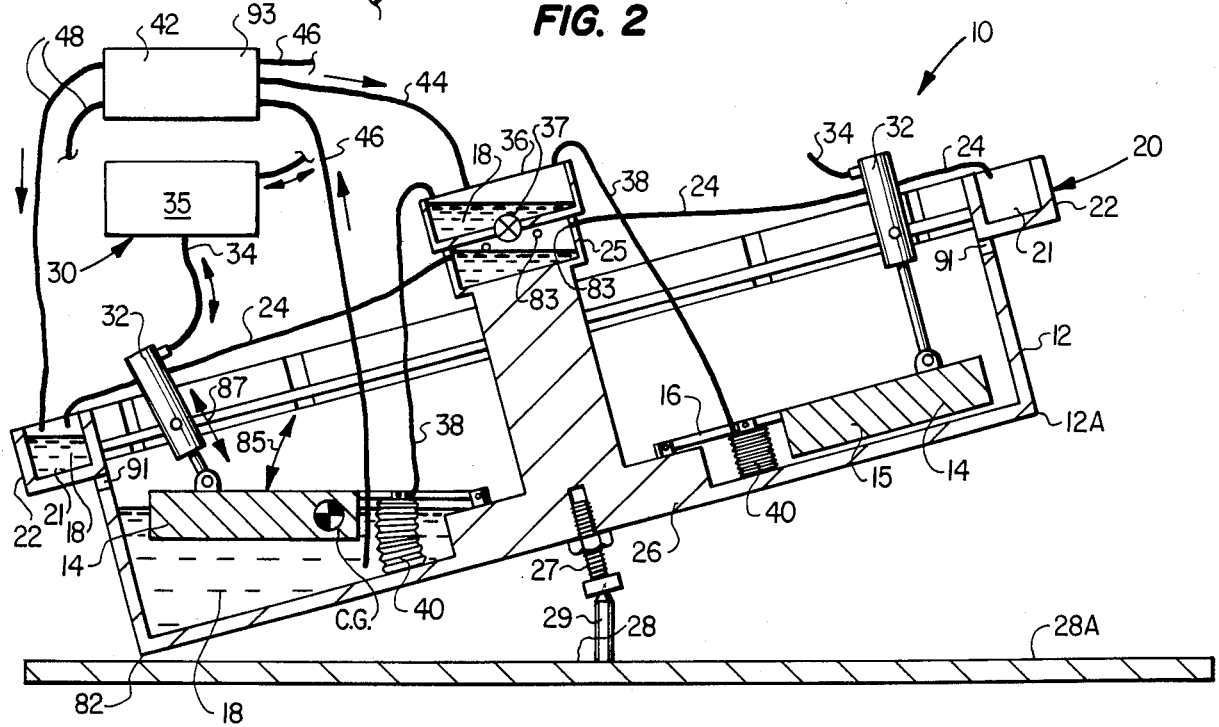
FIG. 1 is a side-elevational, diagrammatic, schematic illustrating the methods and apparatus of the present invention in a first off center position of the flotation tank.

Referring first to FIG. 1, there is shown one embodiment of a system 10 incorporating the principles of the present invention and comprising a swiveling flotation vessel 12, having a plurality of flotation means 14 disposed therein. Each flotation element 14 comprises a flotation body section 15 and a pivot arm 16 to be described in more detail below. A volume of fluid such as water 18 is also contained within the vessel 12 and imparts a supporting buoyant force to the flotation elements 14. Means are provided for shifting the center of gravity around the vessel 12 and includes a fluid ballast network 20 comprising a ballast tank 21 having an outwardly disposed wall section 22 encircling the tank 12 therearound. The ballast tank 21 is round in the present embodiment and is supplied with fluid 18 by a series of flow conduits 24 coupled to a central ballast supply tank 25. It should be noted that a myriad of shapes are possible. The tank 12 is further shown to be constructed herein with a flat bottom region 26 having a pivot leg 27 depending therefrom and which is mounted upon a pivot base plate 28 having a pivot arm 29 upstanding therefrom. The base plate 28 is adapted for receiving and supporting the swivel action of the vessel 12 thereupon. An energy coupling system 30 is connected to the vessel 12 and the flotation members 14 therein for transducing the swiveling motion of said vessel through the buoyant force of the rotationally shifting fluid 18 therein and to hydraulic energy in a manner described in more detail below.

It should be noted that the term "swiveling" is used herein to define a generally circular, tilting motion of the angulated, off balance tank 12 shown herein. The tank 12, in essence, "wobbles" about its center. The term "rotation" or "rotary" is also used because the fluid 18 contained therein rotates within the tank 12 as it "swivels" or "rolls". This action is similar to mechanical "swash" plates but the tank 12 does not actually turn as described below.

Still referring to FIG. 1, the energy coupling system 30 comprises a series of power cylinders 32, preferably of the hydraulic variety adapted for being driven by the flotation elements 14 in response to variations of fluid level within the vessel 12. The hydraulic cylinders 32 are coupled together through power line network 34 constructed for supplying and utilizing the power fluid from cylinders 32. The power line network 34 is coupled to a supply line and fluid motor system 35 shown schematically herein. The system 35 may be constructed in accordance with the hydraulic supply line fluid motor system set forth and shown in U.S. Pat. No. 4,497,173 issued to applicant herein, the teachings of which are incorporated herein by reference. As set forth in said U.S. Patent, a fluid accumulator may be utilized and coupled to the supply line system for fluid storage. A fluid motor is provided in flow communication with a fluid reservoir which is coupled to the cylinders 32. Such a system is conventional in the prior art and is well shown in applicant's prior U.S. patent. It should be noted also that other uses of the accumulated fluid may be selected in accordance with conventional hydraulic systems. The utilization of the hydraulic fluid from the cylinders 32 of the present invention is seen to provide the means for transducing energy through the swivel action of the vessel 12.

Still referring to FIG. 1 the actual swivel of the vessel 12 does not result in the physical rotation of the side walls thereof. Point 12A will always remain at various heights above or upon point 28A. The "swivel" or "rolling" is effected through the ballast network 20 which utilizes the fluid 18 disposed outwardly of the tank 12 within the ballast trough 21 extending circumferentially therearound. Other ballast systems not shown herein are possible, but the fluid system 20 complements the system 10. Flow of the ballast fluid therein is provided by means of a central ballast fluid chamber 25 which is supplied with liquid 18 through an upper ballast supply chamber 36. Supply chamber 36 supplies ballast fluid to underlying chamber 25 through valve 37. Valve 37 may be manually open and/or adjusted in accordance with the principles of the present invention described below. Ballast fluid is provided thereto by a series of flow conduits 38 which extend into the various sections of the vessel 12. Fluid 18 is pumped through the multiple conduits 38 by means of a plurality of pump members 40 coupled to the flotation pivot arms 16 and the base 26 of the vessel 12. As shown in FIG. 1, the pump unit 40 expands with the rise of flotation unit 14 and compresses with the lowering of flotation unit 15. Additional ballast fluid 18 is provided by pump ballast system 42 providing a conduit 44 to feed upper vessel 36. Fluid 18 may be supplied from the vessel 12 through a plurality of hoses 46 extending into various sections of the vessel 12 and/or may feed the ballast network 20 by a series of hoses 48. It should be understood that although one means for providing a ballast network 20 through utilization of fluid 18 is shown here, other ballast means such as mechanical, mechanical electrical and/or other hydraulic flow means can be incorporated. For example, system 42 may utilize air over water pumps disposed within the vessel 12 in conjunction with the pumping units 40, in place thereof, or external thereof for pumping water directly into the ballast feed vessel 36. The ballast pump system herein can also be utilized in conjunction with an independent fluid flow system such as a separate water supply. The present invention can thus be utilized to convert any flowing or moving mass such as water into the creation of a ballast for swiveling of the tank 12 in the manner described herein. The energy derived therefrom is received by hydraulic system 30 or the like and utilized for conventional energy conversion.

Figure 2:
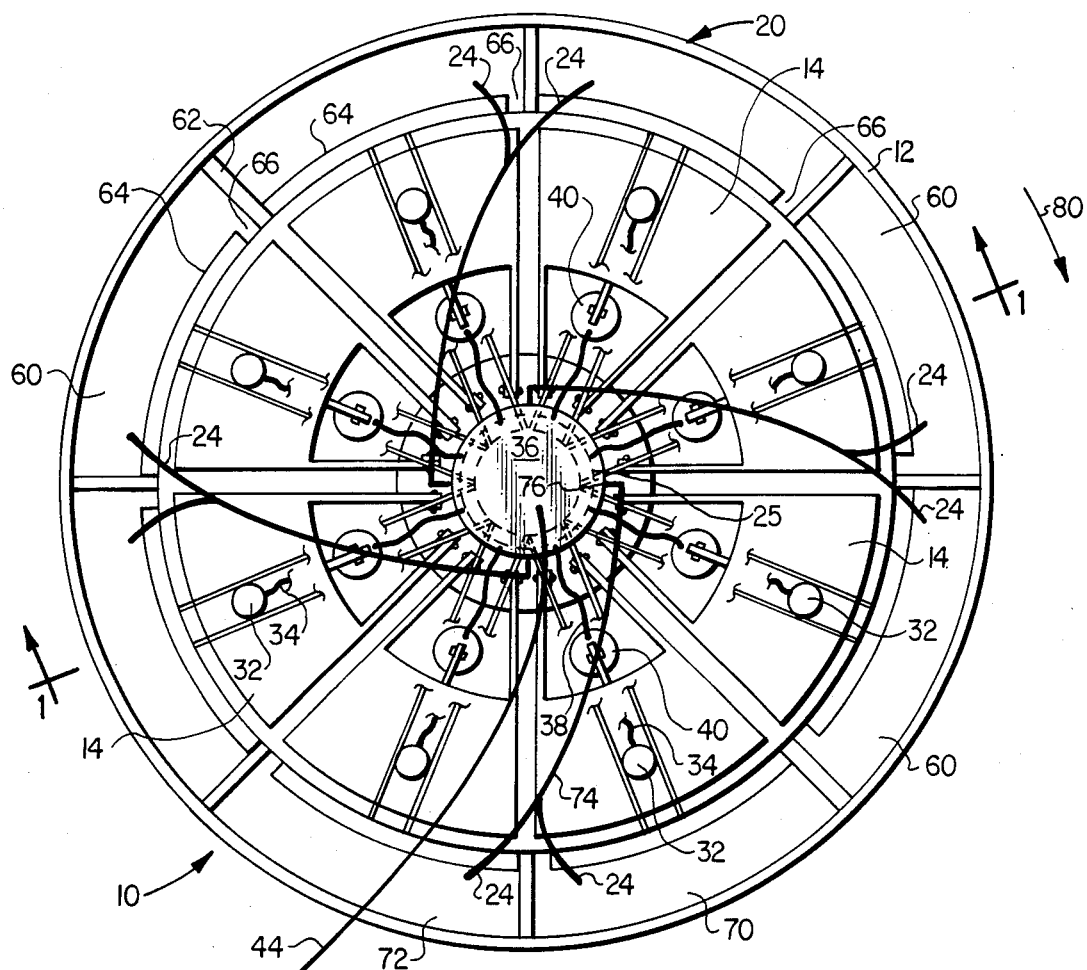
FIG. 2 is a top plan view of the flotation tank of FIG. 1.

Referring now to FIG. 2 there is shown a top plan view of the system 10 of the present invention wherein the tank 12 is shown to be assembled with a plurality of flotation elements 14 pivotally mounted therein. The outer ballast network 20 is shown herein to be comprised of 8 separate ballast sections 60 separated one from the other by bulkheads 62. Internal wall section 64 provide an internal wall opposite external wall 22 for containing ballast fluid therein while the internal wall 64 terminates short of the forward bulkhead 62 and through drainage port 66. Drainage port 66 is utilized to empty the ballast fluid contained within each ballast section 60 into the vessel 12 after the use thereof and the rotation of the vessel therearound. The hydraulic pumps 32 are thus shown herein in fragmentary, diagrammatic form for purposes of clarity with the flow line 34 shown in a short section extending therefrom. Likewise the ballast fluid pumping members 40 are shown disposed inwardly of the body portion 15 of the flotation elements 14 between the pivot arm 16 within the vessel 12. This top plan view illustrates in more detail the actual operation and rotation of the vessel 12 in accordance with the principles of the present invention.

Still referring to FIG. 2 there is shown a diagrammatic, schematic view of the ballast distribution lines 24 which connect each ballast chamber 60 with the ballast fluid tank 25. The top ballast fluid tank 36 is obviously shown, in that it preferably has a greater diameter than the underlying distribution tank 25 which is shown by dotted lines. The distribution conduits 24 are shown to emerge at positions approximately 90° behind the ballast section 60. For example, ballast chambers 70 and 72 are fed by ballast feed line 74 which merges at point 76 from feed region 25. Chambers 70 and 72 are approximately 90°-95° offset from said point 76 and comprise an area 90°-95° in advance of that position when swiveling of the tank 12 is in the direction of arrow 80. Swivel in the direction of the arrow 80 is effected by the flow of ballast fluid into the ballast sections 60 which are disposed at approximately right angles (90°) from the angle of inclination as shown in FIG. 1. This imparts a swivel of the vessel 12 about the lower, outer rim 82 as shown in FIG. 1. Resupply of the ballast fluid in FIG. 2 is shown simply by the conduits 38 for purposes of clarity. The fluid supply means 44 is shown to be coupled directly to upper ballast containment vessel 36 in a diagrammatic fashion. In this manner ballast fluid is continuously fed to the ballast network 20 at a location approximately 90°-95° ahead of the "inclined" position of the vessel 12 as it swivels and pivots around pivot arm 29 to impart the fluid rotation.

In operation, fluid 18 is pumped directly into the ballast containment vessel 36 and valve 37 is then opened for discharge into lower containment section 25. Lower containment section 25 contains a plurality of ports 83 therearound which are coupled to the discharge conduits 24 for feeding fluid 18 to the various ballast sections 60. As ballast sections 60 approximately 90°-95° ahead of the swivel position of the vessel 12 fill, the vessels swivels causing a level fluid 18 therein to advance or rotate the vessel. The advancing level of fluid 18 within the circular vessel 12 (circular is but one slope) causes the movement of the flotation elements 14 in the direction of arrow 85 pumping of the hydraulic cylinders 32 in the direction of arrow 87. The pumping then provides the desired energy to the hydraulic system 30 for energy conversion as provided by the flow of ballast fluid.

The operation of the particular embodiment of the present invention as described herein thus seem to be affected by fluid flow which is imparted due solely to gravitational effects. The gravitational effects are effected by a shifting center of gravity (c.g.), shown in one "instant of time" in FIG. 1. As the ballast vessel 25 is inclined in conjunction with containment vessel 12 the fluid flows outwardly therefrom through the conduit which deflects the ballast fluid into a position approximately 90°-95° ahead of the angular position of the vessel 12. This shifts the c.g. In this manner, the system 10 provides an energy transducer which is capable of continuous operation without the utilization of a multitude of valves and/or more complex simultaneous valve actuation between ballast, actuation fluid and power drive fluid as previously set forth in applicant's U.S.

Pat. No. 4,497,173. The aforesaid patent provides a power transducer system utilizing a straight forward rocking action necessitating in one embodiment, simultaneous valve actuation between the ballast actuation fluid and the power drive fluid. The rocking action is likewise a reciprocating movement which is not as continuous as the even swivel actuation of the vessel 12. The swivel or rolling of vessel 12 along the outer bottom edge 82 thereof facilitates the rise and fall of flotation elements 14 in a smooth sequential manner. Swivel of the vessel 12 in the direction of arrow 80 is therefore provided in a simple straight forward manner with the ballast fluid automatically draining back into the vessel through the ports 66 as described above. Additional fluid accumulation such as that from outside fluid flow into the ballast is drained therefrom by an overflow discharge port 91 as shown in FIG. 1.

It should likewise be noted that the particular angular relationship flow dimension hydraulic system and ballast network are shown diagramatically and for schematic purposes in an effort of full illustration only. Various modifications and changes can be made including the utilization of mechanical ballast means which advance through electrical or electromechanical means within a ballast network 20 disposed outwardly of the vessel 12 and which does not utilize the fluid 18 contained therein. It is, however, the fluid 18 in the tank 12 that affords efficient energy transducing through the rise and fall of the various flotation elements.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. A rotary energy transducer system comprising:
    a flotation tank adapted for generally circular swivel action having fluid disposed therein;
    means for centrally supporting said flotation tank for swiveling therearound through a series of unbalanced positions;
    means for swiveling said tank around said central support and shifting said fluid disposed therein;
    a plurality of flotation means disposed within said tank adapted for floating upon said fluid disposed within said tank; and
    means coupled to said flotation means for actuation therewith in transducing energy from shifting fluid levels within said tank throughout the swiveling thereof.

2. The apparatus set forth in claim 1 wherein said energy transducing means comprises a plurality of piston and cylinder assemblies, each coupled to said plurality of flotation elements adapted for receiving the energy produced by said flotation elements within said flotation tank during said shifting fluid levels therein.

3. The apparatus set forth in claim 2 wherein said cylinder means comprises hydraulic cylinders adapted for the pumping of hydraulic fluid during the rise in fluid level commensurate with shifts in said water level during swiveling of said tank.

4. The apparatus set forth in claim 1 wherein said swivel means comprises ballast means adapted for containing selected fluid levels therein and being secured to the outer perimeter of said tank for imparting said swivel motion thereto.

5. The apparatus set forth in claim 4 wherein said ballast means includes an outer trough secured to said tank and having a plurality of baffles contained therein for defining segmented ballast regions thereof and means coupling said plurality of baffled ballast regions for sequentially receiving fluid therein for the swiveling of said tank.

6. The apparatus as set forth in claim 5 and further including means for selectively pumping fluid into said ballast sections around said tank for swiveling said tank around said pivot.

7. The apparatus as set forth in claim 6 wherein said ballast means includes a central distribution vessel having a plurality of orifices formed therein and coupled in flow communication with said sections of said ballast network.

8. The apparatus as set forth in claim 7 wherein said orifices of said central ballast distribution vessel are coupled to ballast chambers which are disposed on the order of 90° from said orifice for discharging ballast into said ballast region for imparting swivel in the direction thereof.

9. The apparatus as set forth in claim 1 wherein said tank is generally circular in shape and formed with a flat bottom section and supported by central pivotal support and bearing member, with said support a base plate adapted for receiving and supporting said bottom section thereon.

10. A method of transducing energy by rotating fluid levels within a containment vessel comprising the steps of mounting said containment vessel for a series of off balance swivel positions;
    providing a means for imparting said series of off balance positions to said containment vessel;
    disposing a plurality of flotation means within said containment vessel and in positions responsive to shifts in fluid levels within said vessel;
    providing means for absorbing power from said flotation elements within said containment vessel in response to shifts of fluid level therein;
    coupling said flotation elements to said power absorbing means; and
    swiveling said containment vessels around said central pivot for the shifting of said fluid levels therein and the sequential raising and lowering of said plurality of flotation elements within said fluid in response to said variations of said fluid level during said rotation.

11. The method as set forth in claim 10 wherein said off-balance means includes fluid ballast means and the step of swiveling said containment vessel includes the step of shifting fluid within said ballast means for moving the center of gravity of said containment vessel.

12. The method as set forth in cliam 11 wherein said step of shifting said ballast means includes the steps of providing ballast troughs around said containment vessel, providing flow communication means between ballast troughs, and pumping fluid from one trough to another and shifting the center of gravity of said containment vessel secured thereto for imparting the swivel thereof.

13. An improved method of transducing energy a fluid medium of the type wherein water is utilized to move a plurality of energy transducing elements sequentially within a vessel, wherein the improvement comprises:

providing a fluid containment vessel adapted for rolling around a series of off-center positions and the resultant variance of fluid level therein relative to the rolling axis thereof and wherein the step of providing said containment vessel adapted for off-center positioning includes the step of providing a round vessel with a substantially flat bottom section upon a pivot for facilitating the off-center rolling thereof;

providing means for rolling the fluid containment vessel through said series of off-center positions;

providing means for responding to the shift in fluid level exhibited within said containment vessel during said rolling;

actuating said rolling means for moving said containment vessel around said series of off-center positions; and absorbing the energy produced by the rising fluid level on opposition sides of said containment vessel during said rolling through off-center positions thereof through the buoyant force of fluid contained therein and the position of said flotation means within said vessel.

14. The method as set forth in claim 13 wherein said rolling means includes fluid ballast means and the step of rolling said containment vessel includes the step of disposing said fluid ballast means outwardly of said containment vessel and shifting fluid within said ballast means ahead of an off-center position for moving the center of gravity of said containment vessel and imparting rolling thereto.

15. The method as set forth in claim 14 wherein said step of shifting said ballast means includes the steps of providing a plurality of ballast tank sections around said containment vessel, providing fluid flow means in communication with said ballast tank sections, and flowing fluid into said ballast tank sections at a position on the order of 90° ahead of an off-center position of said containment vessel for the rolling thereof.

16. The method as set forth in claim 15 wherein said step of absorbing the energy produced by the rising fluid level within said rolling containment vessel includes the step of providing a plurality of flotation elements within said vessel adapted for responding to shifts in the fluid level therein.

17. The method as set forth in claim 16 wherein said step of providing said flotation elements includes the step of providing energy transducing means responsive to motion of said flotation elements, securing said energy transducing means to said fluid containment vessel, and coupling said energy transducing means to said flotation elements for absorbing said energy produced by said rising fluid level from the rolling of said containment vessel around said series of off-center positions.

* * * * *